United States Patent [19]

Miyabayashi et al.

[11] 3,909,919
[45] Oct. 7, 1975

[54] METHOD OF JOINING THE EDGE PORTIONS OF TWO SHEETS

[75] Inventors: Yoshiyuki Miyabayashi, Seki; Hideo Takizawa, Hachioji; Norihiro Tsuneishi; Hiroyuki Aida, both of Tokyo, all of Japan

[73] Assignee: Nissan Motor Company Limited, Japan

[22] Filed: Jan. 29, 1974

[21] Appl. No.: 437,713

[30] Foreign Application Priority Data
Jan. 31, 1973 Japan.............................. 48-13526

[52] U.S. Cl. ..................... 29/521; 29/509; 29/513; 113/1 N; 113/116 C
[51] Int. Cl.² ..................... B21D 39/00; B23P 11/00
[58] Field of Search ............ 29/463, 462, 509, 512, 29/513, 521, 505; 113/1 N, 116 C, 116 F, 116 R, 118 R

[56] References Cited
UNITED STATES PATENTS

| | | | |
|---|---|---|---|
| 518,767 | 4/1894 | Plecker | 29/505 X |
| 1,808,561 | 6/1931 | Ledwinka | 113/116 C |
| 2,916,181 | 12/1959 | Pfister et al. | 29/521 X |
| 3,009,499 | 11/1961 | Weihe | 29/509 X |
| 3,719,986 | 3/1973 | Ardolino et al. | 29/521 X |
| 3,824,757 | 7/1974 | Coop | 29/521 X |

*Primary Examiner*—C. W. Lanham
*Assistant Examiner*—Victor A. DiPalma
*Attorney, Agent, or Firm*—Robert E. Burns; Emmanuel J. Lobato; Bruce L. Adams

[57] ABSTRACT

Edge portions of two sheets are provided with a hole and a raised portion, respectively. The sheets are placed together with one edge portion extending beyond the other. Said one edge portion is then folded back over the other so that the raised portion of one sheet intrudes into the hole of the other sheet to firmly lock the sheets together.

12 Claims, 17 Drawing Figures

METHOD OF JOINING THE EDGE PORTIONS OF TWO SHEETS

The present invention relates to a method of joining the edge portions of two sheets which may be metallic without the use of mechanical fasteners, metal-to-metal adhesives or welding techniques.

Sheet metal members are often joined by a lock joint which is produced by folding an edge portion of one member back over an edge portion of the other member. Examples of combinations of such sheet metal members are, in an automotive vehicle, inner and outer wall members of a door structure, a front fender with a front fender supporting hood, and an outer wall member with an associated reinforcing member of a trunk structure.

To assemble these sheet metal members by folding as mentioned above, it is a common practice to have one of the sheet metal members superposed on the other and fold an edge portion of one back over an edge portion of the other so that mating surfaces of the sheets are in close contact with each other. In order that two sheet metal members combined in this manner be prevented from being displaced relative to each other from their initially fixed positions, it is important that the sheet metal member held by the folded sheet metal member be sufficiently tightly held by the folded member so that no gap exists between the edge of the edge portion of the former and the folded over end of the latter. Since, however, the dimensional accuracy usually varies from one sheet metal member to another where the sheet metal members are manufactured on a large-scale commercial basis, and for the purpose of achieving satisfactory productivity in the assembly of sheet metal members as in the automotive industry, it is practically impossible to achieve a gap-free fit between sheet metal members which are combined by a prior art folding process. To prevent relative displacement between joined sheet metal members, the sheet metal members may be subjected to additional processing such as, for example, spot-welding or bonding with a metal-to-metal adhesive during the assembly operation to provide reinforcement for the lock joint produced in the assembled structure. If, however, the sheet metal members are spot-welded when they are being joined together, the members tend to be distorted, and additional operations and equipment are necessitated ro remedy the distortioin of the members combined. This is a problem especially with members which are oriented outwardly in working positions in a final product such as an automotive vehicle. To constantly achieve accuracy in spot-welding operations of a great number of workpieces, sustained maintenance and servicing efforts are indispensable for jigs used for the spot-welding operations. If, on the other hand, a metal-to-metal adhesive is used to reinforce the lock joint between the sheet metal members, it becomes difficult to maintain the initially fixed relative positions of the joined members throughout the succeeding steps of the assembly operation during which the adhesive applied to the members remains wet. Sheet metal members joined together using a metal-to-metal adhesive are thus still subject to relative displacement until they are painted and baked during the final stages of the assembly operation. The present invention contemplates elimination of all the above mentioned drawbacks which are inherent in joining edge portions of two sheet metal members by prior art folding processes.

It is, accordingly, an important object of the present invention to provide a method of tightly joining edge portions of two sheets without supplementary processing such as chemical bonding, welding or the use of mechanical fasteners such as bolts or rivets.

The above and other objects, features and advantages of a method according to the present invention will become more apparent from the following description taken in conjunction with the accompanying drawings. In the several drawings, like reference numerals and characters designate corresponding members and portions, to facilitate comparison of the several embodiments.

FIGS. 2B, 3B and 4B are cross sectional views showing two sheets which are in the process of being joined by the methods illustrated in FIGS. 2A, 3A and 4A, respectively;

Figure 9A:
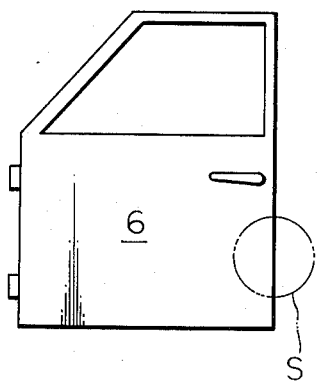
FIGS. 9A and 9B are, respectively outside and inside elevations of a door assembly joined by a method of the invention.
Figure 9B:
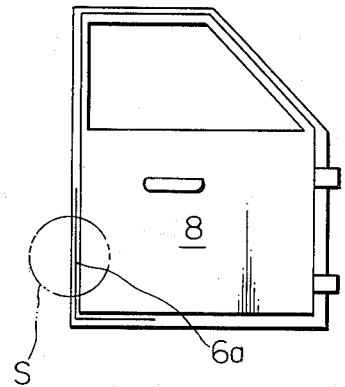

FIGS. 9A and 9B show an example of practical structural members joined by a method of the invention. An automobile door assembly includes a door 6 and a door inner panel 8 joined to the door 6. FIG. 9A shows the outside of the door 6 while FIG. 9B shows the inside thereof and the inner panel 8. The methods of the invention relate to joining the inner panel 8 to the door 6 by folding an edge portion 6a of the door 6 back over the peripheral edge of the inner panel 8.

FIGS. 9A and 9B are exemplary only, and the invention is not limited to automotive doors or other automotive structures. FIGS. 1 to 8 can be considered as illustrating methods of joining the inner panel 8 to the door 6 within a portion surrounded by a broken circle S.

Figure 1:
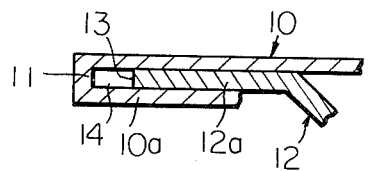
FIG. 1 is a cross sectional view showing an example of two sheet metal members whose edge portions are joined together by a prior art folding process.

As illustrated in the prior art method of FIG. 1, sheet metal members 10 and 12 are joined at their edge portions by a conventional folding method so that an edge portion 10a of the sheet metal member 10 is folded back over the edge portion 12a of the other sheet metal member 12 so that the latter is tightly gripped by the former. For the reasons previously explained, a gap 14 is inevitably produced between the inner face of a folded end 11 of the sheet metal member 10 and an edge 13 of the edge portion 12a of the sheet metal member 12. The goal of the present invention is to enable the sheet metal members 10 and 12 to be joined by a tighter lock joint produced only by a folding operation and without the use of any mechanical fasteners, metal-to metal adhesives or spot-welding, so that the members are not movable relative to each other even though the gap 14 is present.

According to the invention this is generally accomplished by forming a hole through an edge portion of one of the sheets, forming on an edge portion of the other sheet a raised portion having a shape conjugate to the hole and sized smaller than the hole, placing the sheets together with one of the edge portions extending beyond the other edge portion, and folding the edge portion extending beyond the other edge portion to dispose it over the other edge portion so that the raised portion intrudes into the hole and that mating surfaces of the sheets are in contact with one another.

Figure 2A:
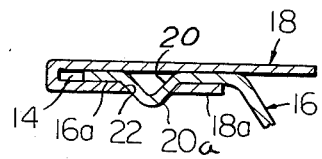
FIGS. 2A, 3A and 4A are cross sectional views showing first, second and third preferred methods, respectively, of joining the edge portions of two sheet according to the present invention, in which holes are formed through the folded sheet and raised portions are formed on the other sheet.
Figure 2B:
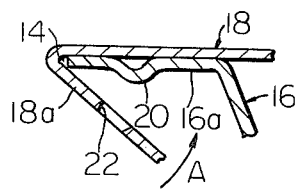

Referring to FIGS. 2A and 2B, showing a first preferred method of the present invention, a first sheet or sheet metal member 16 has an edge portion 16a, and a second sheet or sheet metal member 18 has an edge portion 18a which is folded back over the edge portion 16a of the first sheet metal member 16. The first sheet metal member 16 has formed on its edge portion 16a at least one raised portion 20, while the second sheet metal member 18 has formed through its edge portion 18a at least one hole 22. The mating surfaces of the edge portions 16a and 18a are in tight contact with each other with the raised portion 20 protruding into the hole 22 so that a lock joint is produced between the edge portions 16a and 18a of the first and second sheet metal members 16 and 18, respectively. The hole 22 may have a circular, elongated, beadlike or other shape, and the shape of the raised portion 20 is conjugate to that of the hole 22. As shown in FIG. 2A a portion 20a of raised portion 20 protrudes through and from the hole 22 and is sized smaller than this hole, thereby facilitating the mating of the raised portion and hole.

The members 16 and 18 are initially placed together with the edge portion 18a extending beyond the edge portion 16a. The edge portion 18a is then folded back over the edge portion 16a in the direction of arrow A (FIG. 2B) until mating surfaces of the sheets 16 and 18 are in tight mutual contact and the raised portion 20 protrudes into the hole 22. It is clear that the sheets 16 and 18 joined in this manner cannot be slid relative to each other in spite of the gap 14. Methods of orienting members such as those shown at 16 and 18 relative to each other during a folding process, so that a raised portion 20 will engage with a hole 22 when an edge portion 18a is folded over an edge portion 16a, are well known, by themselves, in the art, and a detailed description will therefore not be given herein.

Figure 3A:
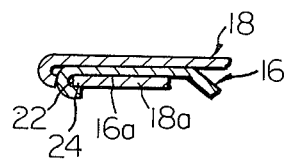
Figure 3B:
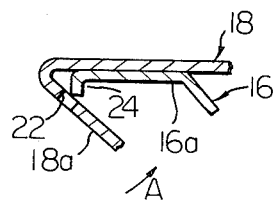

Referring to FIGS. 3A and 3B, showing a second preferred method of the present invention, again the first sheet metal member 16 has the edge portion 16a and the second sheet metal member 18 has the edge portion 18a which is folded back over the edge portion 16a of the first sheet metal member 16. In this embodiment edge portion 16a of the first sheet metal member 16 has at least one raised portion 24 which includes the edge of the edge portion 16a, while the edge portion 18a of the second sheet metal member 18 is formed with at least one hole 22. The edge portion 18a is folded back over the edge portion 16a as in the first method of FIGS. 2A and 2B, with the raised portion 24 protruding into the hole 22.

Figure 4A:
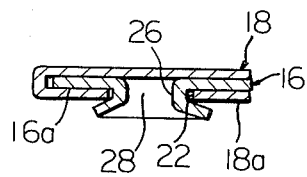
Figure 4A:
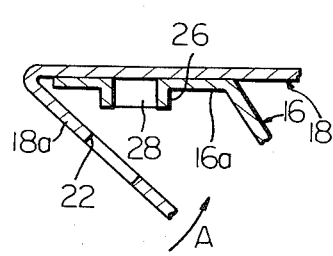

Referring to FIGS. 4A and 4B, showing a third preferred method of the present invention, the first edge portion 16a has a raised portion 26 with another hole 28 formed therethrough. The method is thereafter similar to the previous methods except that after the edge portion 18a is folded back over the edge portion 16a, the part of the raised portion 26 extending through the hole 22 and defining the end of hole 28 remote from sheet 18 is bent back over part of the edge portion 16a to provide an even stronger lock joint.

Figure 5A:
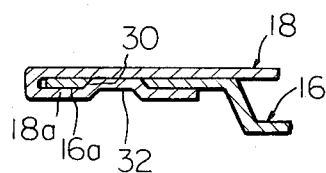
FIGS. 5A, 6A and 7A are cross sectional views showing fourth, fifth and sixth preferred methods, respectively, of joining the edge portions of two sheet according to the present invention, in which the raised portions are formed on the folded sheet and the holes are formed through the sheets which is held by the folded sheet.
Figure 5B:
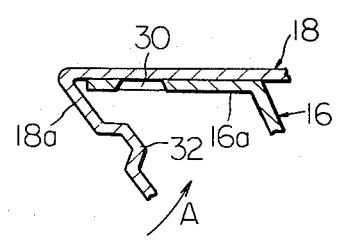
FIGS. 5B, 6B and 7B are cross sectional views showing the two sheets which are in the process of being joined by the methods illustrated in FIGS. 5A, 6A and 7A, respectively.

Referring to FIGS. 5A and 5B, showing a fourth preferred method of the present invention, the first sheet metal member 16 has the edge portion 16a and the second sheet metal member 18 has the edge portion 18a which is folded back over the edge portion 16a of the first sheet metal member 16. The first sheet metal member 16 has formed through its edge portion 16a at least one hole 30, while the second sheet metal member 18 has formed on its edge portion 18a at least one raised portion 32. This fourth method is identical to the first method of FIGS. 2A and 2B except that the hole 30 is formed through the first member 16 rather than the second member 18 as is the case in FIGS. 2A and 2B, and vice versa for the raised portion 32.

Figure 6A:
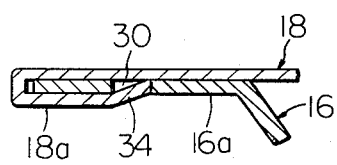
Figure 6B:
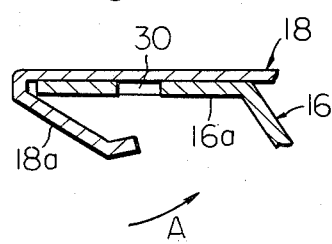

Referring to FIGS. 6A and 6B, showing a first preferred method of the present invention, the first sheet metal member 16 has edge portion 16a formed with at least one hole 30, and the second sheet metal member 18 is folded back over the edge portion 16a of the first sheet metal member 16 and is formed with at least one raised portion 34 at its edge. This fifth method is identical to the fourth method of FIGS. 5A and 5B except that the raised portion 34 includes the edge of the edge portion 18a.

Figure 7A:
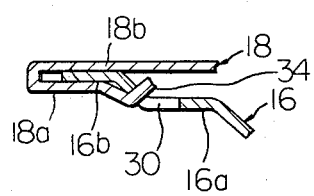
Figure 7B:
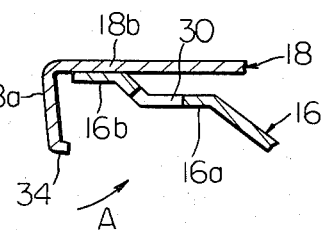

A sixth preferred method of the invention shown in FIGs. 7A and 7B is a modified version of the fifth method illustrated in FIGs. 6A and 6B, and is identical thereto except that the raised portion 34 and the hole 30 are spaced from mating surfaces 16b and 18b of the members 16 and 18 respectively after the edge portion 18a is folded back over the edge portion 18b.

Figure 8A:
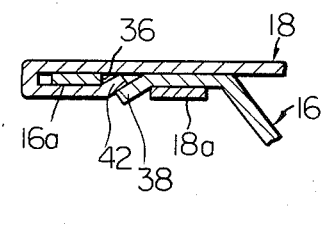
FIG. 8A is a cross sectional view showing a seventh preferred method of joining the edge portions of two sheets according to the present invention, wherein both of the sheets are formed with respective holes and raised portions.
Figure 8B:
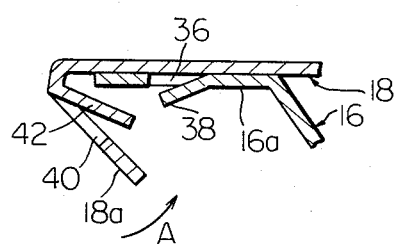
FIG. 8B is a cross sectional view showing the two sheets which are in the process of being joined by the method illustrated in FIG. 8A.

In each of the methods thus far described, the hole is formed through one of the sheet metal members and the raised portion is formed on the other, but in the seventh method of the present invention shown in FIGS. 8A and 8B, a hole and a raised portion are provided for each of the two sheet metal members. Referring to FIGS. 8A and 8B, the first sheet metal member 16 has the edge portion 16a which is formed with at least one hole 36 which is punched in a manner to provide a raised portion 38 in the form of a lug, and the second sheet metal member 18 has the edge portion 18a which has at least one hole 40 similarly formed to provide a lug or raised portion 42. The raised portions 38 and 42 of the first and second sheet metal members 16 and 18, respectively, face each other during the folding process and protrude into the holes 36 and 40 respectively. It will be understood that this configuration provides a lock joint of even greater strength than the previously described methods of the invention, because twice as many raised portions and holes are provided. While a lock joint produced by a method according to the present invention is sufficiently strong to maintain the joined members free from relative displacement, the same may be further reinforced by spot-welding or a metal-to-metal adhesive if desired.

What is claimed is:

1. A method of joining two sheets, comprising;
   a. providing a first sheet with a hole extending through an edge portion of the sheet;
   b. providing an edge portion of a second sheet with a raised portion having a shape conjugate to the shape of said hole;
   c. placing the sheets together with at least parts of them overlying one another and with one of said edge portions disposed adjacent to and extending beyond the other edge portion; and
   d. thereafter folding said one edge portion back to place the two edge portions in mutually overlying relationship, to insert said raised portion into said hole and thereby to hold mating surfaces of the edge portions in fixed contact with one another.

2. A method as claimed in claim 1, in which said hole is provided extending through said edge portion extending beyond said other edge portion and said raised portion is provided on said other edge portion.

3. A method as claimed in claim 1, in which said raised portion is provided on said edge portion extending beyond said other edge portion and said hole is provided in said other edge portion.

4. A method as claimed in claim 1, in which the shapes of said hole and said raised portion are substantially circular.

5. A method as claimed in claim 1, in which the shapes of said hole and said raised portion are elongate.

6. A method as claimed in claim 2, in which said raised portion includes a free edge of said other edge portion.

7. A method as claimed in claim 3, in which said raised portion includes a free edge of said edge portion extending beyond the other edge portion.

8. A method as claimed in claim 1 in which said raised portion is provided with a tip smaller than said hole, to facilitate the inserting of the raised portion in said hole.

9. A method as claimed in claim 1, further including; providing said raised portion with a second hole extending through said portion but leaving a part of said portion raised; and bending said part of said raised portion over a part of said edge portion defining said first hole, incident to said folding back of said one edge portion.

10. A method as claimed in claim 1, in which said edge portions are shaped so that said hole and said raised portion inserted therein are disposed in a plane spaced from said mating surfaces.

11. A method as claimed in claim 1, further including; providing the edge portion of said first sheet with a raised portion adjacent said hole; and providing the edge portion of said other sheet with a hole extending through the respective edge portion, adjacent said raised portion thereof, and performing said folding so that said raised portion of the first sheet intrudes into said hole of the other sheet and that said raised portion of the other sheet intrudes into said hole of said first sheet.

12. A method of joining two sheets, comprising;
   punching an edge portion of a first sheet to provide a first lug in a first hole in said edge portion;
   punching an edge portion of another sheet to provide a second lug in a second hole therein;
   placing the sheets together in at least partly mutually overlying relationship and with one of said edge portions disposed adjacent to and extending beyond the other edge portion; and
   folding said one edge portion back over said other edge portion so that said first and second lugs intrude into said second and first holes respectively and that mating surfaces of the sheets are in contact with one another.

* * * * *